United States Patent
Kamakura et al.

(10) Patent No.: US 7,585,433 B2
(45) Date of Patent: Sep. 8, 2009

(54) POLYANILINE/CARBON COMPOSITE AND ELECTRIC DOUBLE-LAYER CAPACITOR USING SAME

(75) Inventors: Ayumu Kamakura, Kanagawa (JP); Tsukasa Maruyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/945,799

(22) Filed: Nov. 27, 2007

(65) Prior Publication Data
US 2008/0139742 A1   Jun. 12, 2008

(30) Foreign Application Priority Data
Nov. 28, 2006 (JP) ............... 2006-320542
Oct. 15, 2007 (JP) ............... 2007-268187

(51) Int. Cl.
*H01B 1/12* (2006.01)
(52) U.S. Cl. ............... 252/500; 252/510
(58) Field of Classification Search ........ 252/500, 252/510; 429/209; 361/502; 528/210
See application file for complete search history.

(56) References Cited

U.S. PATENT DOCUMENTS

| | | | |
|---|---|---|---|
| 7,351,359 B2 * | 4/2008 | Maruyama et al. | 252/500 |
| 2004/0232390 A1 * | 11/2004 | Viswanathan | 252/500 |

FOREIGN PATENT DOCUMENTS

| | | | |
|---|---|---|---|
| JP | 7201676 | | 8/1995 |
| JP | 10321482 | | 12/1998 |
| JP | 2001093783 | | 4/2001 |
| JP | 2002025865 | * | 1/2002 |
| JP | 2002025868 | | 1/2002 |
| JP | 2003017370 | | 1/2003 |
| JP | 2005-085947 | | 3/2005 |
| WO | WO-2005-090446 | | 9/2005 |

* cited by examiner

*Primary Examiner*—Mark Kopec
(74) *Attorney, Agent, or Firm*—Connolly Bove Lodge & Hutz LLP

(57) ABSTRACT

A polyaniline/carbon composite composed of polyaniline or its derivative combined with a carbonaceous material, in which polyaniline/carbon composite, the polyaniline or its derivative is a conductive polyaniline or its derivative dispersed in a non polar organic solvent is undoped. This polyaniline/carbon composite is capable of providing an active substance for a polarizable electrode and the polarizable electrode is capable of providing an electric double-layer capacitor having a high electrostatic capacity, an excellent electric charge-discharge characteristics and an excellent cycle characteristics.

4 Claims, No Drawings

POLYANILINE/CARBON COMPOSITE AND ELECTRIC DOUBLE-LAYER CAPACITOR USING SAME

RELATED APPLICATIONS

This application claims priority to Japanese Application No. 2006-320542 filed Nov. 28, 2006 and Japanese Application No. 2007-268187 filed Oct. 15, 2007, disclosures of which are incorporated herein by reference.

TECHNICAL FIELD

The present invention relates to a polyaniline/carbon composite and an electric double-layer capacitor using the same, more particularly relates to a polyaniline/carbon composite capable of providing an electric double-layer capacitor having a high electrostatic capacity and an excellent cycle characteristics and an electric double-layer capacitor using the same.

BACKGROUND ART

In the past, as a polarizable electrode of an electric double-layer capacitor, usually activated carbon or fibrous activated carbon has been used, but this has the problem that the electrodischarge capacity is small and therefore it is not possible to maintain a discharge over a long period of time at the time of actual use.

To solve this problem, Japanese Patent Publication (A) No. 7-201676 and Japanese Patent Publication (A) No. 2002-25868 propose to prepare a conductive polymer/carbon composite by electrolytic polymerization of a conductive polymer in a suspension of activated carbon (or carbon) and use the resultant composite as the polarizable electrode of an electric double-layer capacitor. They use a polyaniline/carbon composite as a polarizable electrode in working the inventions. According to these, there is the advantage that, compared with the case of use of a conventional polarizable electrode, the specific electrostatic capacity is larger and the internal resistance becomes smaller. However, electrolytic polymerization has the problem that the area of the electrode thus obtained is limited, so polymerization over a large area is difficult and not suitable for industry. Further, Japanese Patent Publication (A) No. 2002-25865 proposes to chemically polymerize aniline in the presence of a carbonaceous material in an aqueous solution so as to obtain a polyaniline/carbon composite and to use this as a polarizable electrode, but the polyaniline/carbon composite thus obtained has to be rinsed in water, so there is the problem that the operation becomes troublesome.

In addition, according to Japanese Patent Publication (A) No. 2002-25865, a composite is formed such that a carbonaceous material is impregnated with aniline and then the aniline is polymerized to form polyaniline on the carbonaceous material and, therefore, the small pores of the carbonaceous material is reduced and the remarkable improvement in the electrostatic capacity becomes difficult.

Further, according to Japanese Patent Publication (A) No. 2003-17370, it is proposed to mix a polyaniline sulfonic acid, an electrode active substance (e.g., activated carbon) and a carbon-based conductive substance in water, then distill off the mixing solvent, i.e., water, in vacuo to obtain a polyaniline/carbon composite and use the resultant composite, as a capacitor electrode. However, in the capacitor using a water-based electrolyte solution, the water-soluble polyaniline sulfonic acids is easy to leachout from the electrode and, therefore, there is the problem of inferior long term stability, as an electrode for a capacitor. Further, in the capacitor using an organic solvent-based electrolyte solution, due to the high affinity of polyaniline sulfonic acids with water, it is not possible to completely remove the water used at the time of production of the electrode from the electrode and, therefore, there are the problems of a decrease in drive voltage and inferior long term cycle characteristics. Further, there is also the problem that the sulfonic acid groups of the side chains of the polyaniline sulfonic acids cause the decrease in the drive voltage. Further, undoped polyaniline (i.e., emeraldine base-type) can be dispersed and dissolved in N-methyl-2-pyrrolidone (NMP), and, therefore, it has been proposed to mix a polyaniline/NMP solution and electrode active substance (e.g., activated carbon) and carbon-based conductive substance, then to heat and distill off in vacuo the mixing solvent, i.e., NMP to obtain a polyaniline/carbon composite and use the composite, as an electrode for a capacitor. However, a polyaniline/NMP solution includes both a state where the polyaniline particles are dissolved in the NMP and a state where the polyaniline agglomerates are dispersed in the NMP. The above-mentioned polyaniline/carbon composite includes polyaniline agglomerates as well. The polyaniline agglomerates do not allow high speed, quantitative electrochemical reactions, and therefore, in the electrode using the above-mentioned composite, the composite polyaniline could not sufficient contribute to the improvement in the electrostatic capacity and it was difficult to improve the discharge capacity corresponding to the formation amount of the polyaniline composite.

DISCLOSURE OF THE INVENTION

Accordingly, the object of the present invention is to eliminate the above-mentioned problems in the prior art and obtain more easily a polyaniline or its derivative/carbon composite capable of providing an electric double-layer capacitor having a high electrostatic capacity and an excellent cycle characteristics in an electric double-layer capacitor using a conductive polymer as a polarizable electrode.

In according with the present invention, there are provided a polyaniline/carbon composite comprising polyaniline or its derivative combined with a carbonaceous material, in which polyaniline/carbon composite the polyaniline or its derivative is a conductive polyaniline or its derivative dispersed in a nonpolar organic solvent and undoped and a polarizable electrode and electric double-layer capacitor using this as an active substance.

According to the present invention, by using a conductive polyaniline or its derivative stably dispersed in a nonpolar organic solvent in an undoped state, it is possible to obtain an electrode material for an electric double-layer capacitor exhibiting a high electrostatic capacity, an excellent electric charge-discharge property and an excellent cycle characteristics by a simple method.

BEST MODE FOR CARRYING OUT THE INVENTION

The inventors engaged in research to solve the above problems and, as a result, succeeded in achieving the above object by preparing a conductive polyaniline dispersion comprised of polyaniline dispersed in a nonpolar organic solvent in a doped state, combining this conductive polyaniline stably dispersed in the nonpolar organic solvent with a carbonaceous material in the undoped state, and thereby preparing a polyaniline/carbon composite and bonding this to a current collector so as to form a polarizable electrode.

In the present invention, by chemically polymerizing polyaniline or its derivative in a nonpolar organic solvent, it is possible to efficiently mass produce a conductive polyaniline dispersion in a doped state. The polyaniline or its derivative used in the present invention is usually obtained by oxidatively polymerizing aniline or its derivative or any mixture of these. As the aniline derivative, an aniline derivative having at least one of an alkyl group, alkenyl group, alkoxy group, alkylthio group, aryl group, aryloxy group, alkylaryl group, arylalkyl group and alkoxyalkyl group as a substituent group at a position other than the 4-position of the aniline may be illustrated. An aniline derivative having preferably at least one of a $C_1$ to $C_5$ alkyl group, a $C_1$ to $C_5$ alkoxy group and a $C_2$ to $C_5$ alkoxyalkyl group, a $C_6$ to $C_{10}$ aryl group, as a substituent group, may be illustrated.

The dopant used in the present invention may be made sulfonic acid compound able to make polyaniline disperse in a nonpolar solvent. Specifically, an aliphatic or aromatic sulfonic acid having one or more sulfonic acid groups and their salts, alkyl sulfonic acid, aryl sulfonic acid, alkylaryl sulfonic acid, α-olefin sulfonic acid, higher aliphatic ester sulfonic acid, (di)alkyl sulfosuccinic acid, higher aliphatic amide sulfonic acid, camphor sulfonic acid, and salts of the same may be mentioned. Preferably dodecyl benzene sulfonic acid, tetradecyl benzene sulfonic acid, octadecyl benzene sulfonic acid, dodecyl sulfonic acid, tetradecyl sulfonic acid, octadecyl sulfonic acid, dodecyl sulfosuccinic acid, didodecyl sulfosuccinic acid and their salts etc. may be mentioned. The amount of these dopants used is not particularly limited, but use of 0.01 to 5 moles per mole of aniline or its derivative is preferable. Use of 0.1 to 3 moles is more preferable.

The oxidizing agent for oxidative polymerization of aniline is not particularly limited so long as it can polymerize the above aniline or its derivative. For example, ammonium persulfate, persulfuric acid, sodium persulfate, potassium persulfate and other persulfates, hydrogen peroxide, ferric chloride, ferric sulfate, potassium dichromate, potassium permanganate, hydrogen peroxide-ferrous salt, and other redox initiators etc. may be preferably used. These oxidizing agents may be used alone or may be used combined in two or more types. The amount of these oxidizing agents used is not particularly limited so long as an amount enabling oxidative polymerization of the above aniline or its derivative, but is preferably 0.01 to 10 moles, more preferably 0.1 to 5 moles, per mole of the aniline or its derivative.

As the molecular weight adjuster used in the present invention, an aniline derivative having a substituent group at the 4-position, a thiol compound, a disulfide compound, and/or an α-methyl styrene dimer may be mentioned. As an aniline derivative having a substituent group X at the 4-position, a compound of the formula (I):

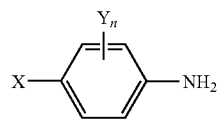

(I)

may be mentioned. In formula (I), X indicates an alkyl group, alkenyl group, alkoxyl group, alkylthio group, aryl group, aryloxy group, alkylaryl group, arylalkyl group, alkoxyalkyl group or halogen group, Y indicates a hydrogen atom, alkyl group, alkenyl group, alkoxyl group, alkylthio group, aryl group, aryloxy group, alkylaryl group, arylalkyl group, alkoxyalkyl group or halogen group, n indicates an integer of 0 to 4, and, when n is an integer of 2 to 4, Y may be the same or different. The preferable substituent group X is a $C_1$ to $C_5$ alkyl group, alkoxy group, alkoxyalkyl group or $C_6$ to $C_{10}$ aryl group, while the preferable substituent group Y is a hydrogen atom, $C_1$ to $C_5$ alkyl group, alkoxy group, alkoxyalkyl group or $C_6$ to $C_{10}$ aryl group.

As the thiol compound and/or disulfide compound used in the present invention, butyl mercaptan, octyl mercaptan, dodecyl mercaptan, hexadecyl mercaptan, tetradecyl mercaptan, 2,2,4,6,6-pentamethylheptane-4-methylenethiol, or other thiol compounds, diethyl disulfide, dibutyl disulfide, or other alkyl disulfides, diphenyl disulfide, dibenzyl disulfide, or other aromatic disulfides, dimethyl xanthogen disulfide, diethyl xanthogen disulfide, or other xanthogen disulfides, tetramethyl thiuram disulfide, tetraethyl thiuram disulfide, or other thiuram disulfides and other disulfide compounds may be mentioned. These are known compounds most of which are generally available commercially. The amount of the molecular weight adjusters used is not particularly limited, but use of $5.0 \times 10^{-5}$ to $5.0 \times 10^{-1}$ moles per mole of aniline or its derivative is preferable, while use of $2.0 \times 10^{-4}$ to $2.0 \times 10^{-1}$ moles is more preferable.

The interphase transfer catalyst used in the preferred mode of the present invention is generally used as an interphase transfer catalyst. Specifically, benzyl triethyl ammonium chloride, methyl trioctyl ammonium chloride, tetra-n-butyl ammonium bromide, tetra-n-butyl ammonium iodide, tetra-n-butyl ammonium chloride, or other tetraalkyl ammonium halides; tetrabutyl ammonium hydroxide, and other tetraalkyl ammonium hydroxides; methyl triphenyl phosphonium bromide, and other tetraalkyl phosphonium-halides; 12-crown-4, 15-crown-5, 18-crown-6, and other crown ether, etc. may be mentioned. Among these, from the viewpoint of the removal of the catalyst after the reaction and other ease of handling, tetraalkyl ammonium halides are preferable. In particular, the industrially inexpensively available tetra-n-butyl ammonium bromide or tetra-n-butyl ammonium chloride is preferable. In the present invention, the amount of the interphase transfer catalyst used according to need is not particularly limited, but preferably 0.0001 mole equivalent or more, more preferably 0.005 mole equivalent or more, with respect to the oxidizing agent is used. If excessively using the interphase transfer catalyst, the isolation and purification steps after the end of the reaction become difficult, so when used, this is used in the range of preferably 5 mole equivalents or less, more preferably an equimolar amount or less.

Regarding the method of oxidatively polymerizing the aniline or its derivative according to the present invention, it is possible to employ the conventional method except for making use of the above reaction ingredients an essential requirement. Other general use additives may also be used as in the past so long as they do not detract from the object of the present invention. The polymerization medium of the present invention uses two types of liquid solvents, that is, water and an organic solvent, as solvents. The above organic solvent is not particularly limited so long as it dissolves aniline or its derivative and is nonaqueous. As specific examples, benzene, toluene, xylene, and other aromatic hydrocarbons; hexane, heptane, octane, and other aliphatic hydrocarbons; dichloroethane, chloroform, 1,2-dichloroethane, chlorobenzene, dichlorobenzene, and other halogenated hydrocarbons; diethyl ether, di-n-propyl ether, diisopropyl ether, di-n-butyl ether, tert-butyl methyl ether, and other ethers; ethyl acetate, n-propyl acetate, isopropyl acetate, and n-butyl acetate, and other esters may be mentioned. Among these, the preferable ones are aromatic hydrocarbons, aliphatic hydrocarbons, and halognated hydrocarbons, while the particularly preferable ones are the inexpensive, low toxicity toluene and xylene. The above organic solvents may also be used in mixtures of two or more types. The amount of the liquid solvent used may be the stirrable amount. Usually, 1 to 500 weight equivalents, preferably 2 to 300 weight equivalents, with respect to the aniline or its derivative, are used. Here, the amount of the organic solvent used is 0.05 to 30 weight equivalents, preferably 0.1 to 10 weight equivalents, with respect to the water.

The reaction temperature is not particularly limited, but is preferably −10° C. to 80° C. The polyaniline oxidatively polymerized in accordance with the present invention is extremely high in yield, usually 80% or more, and has an electrical conductivity of $10^9 Scm^{-1}$ or more.

According to the present invention, said polyaniline or its derivative is obtained by chemical polymerization with said dopant (e.g., dodecyl benzene sulfonic acid, tetradecyl benzene sulfonic acid, octadecyl benzene sulfonic acid, dodecyl sulfonic acid, tetradecyl sulfonic acid, octadecyl sulfonic acid, dodecyl sulfosuccinic acid, didecyl sulfosuccinic acid) in a mixed solvent comprised of two types of liquid solvents, that is, water and an organic solvent (e.g., toluene and xylene), in the presence of said molecular weight adjuster and an interphase transfer catalyst. The obtained polyaniline or its derivative is stably dispersed in the nonpolar organic solvent in the doped state due to the stereo effect of the dopant and the affinity of the dopant with a nonpolar solvent.

In addition, the resultant polyaniline or its derivative has a particle diameter of 0.5 µm or less and the particle size distribution is in the monodispersed state and is stably dispersed in an aprotonic solvent. Accordingly, the polyaniline or its derivative in the below-mentioned polyaniline/carbon composite is made in the form of the composite independently and highly dispersed state, without causing the agglomeration of the particles with each other.

The carbonaceous material usable in the present invention is not particularly limited, but, for example, includes a powder state, particle state, fiber state, or molded state activated carbon, Ketjen black, acetylene black, furnace black, and other carbon blacks, carbon fibers, carbon nanotubes, fullerene, etc. A carbon-based material having a specific surface area of 20 $m^2$/g or more (determined by the nitrogen adsorption method according to JIS K 6217) is preferable. These carbonaceous materials may be used alone or in any mixtures of various types of carbonaceous materials. A carbonaceous material is known, for example, it is commercially available as Kuraray Chemical's Fine Activated Carbon RP and Fine Activated Carbon YP, Lion Corporation's Ketjen Black EC300J and Ketjen Black EC600JD, Denki Kagaku Kogyo's Denka Black, Denka Black FX-35 and Denka Black HS-100, Showa Denko's Vapor Phase Carbon Fiber VGCF, Frontier Carbon's Nanom Mix, Nanom Purple, Nanom Black, etc.

The polyaniline or its derivative of the polyaniline/carbon composite according to the present invention is obtained by dedoping the conducting polyaniline of the conductive polyaniline dispersion. The amount of this undoped polyaniline or its derivative is not particularly limited, but preferably 1 to 300 parts by weight, based upon 100 parts by weight of the carbon-based material is used. If this ratio is small, a sufficient increase in the capacity is liable not to be seen, while conversely if large, not only an effect commensurate with the mixed amount of the polyaniline is not obtained, but also the formation of a composite with the carbon-based material becomes difficult, and, therefore, this is not preferred.

As examples of preparation of the polyaniline/carbon composite of the present invention, the following methods may be illustrated.

(1) A dispersion obtained by mixing a conductive polyaniline dispersion and a carbonaceous material is treated with a basic substance to prepare a polyaniline/carbon composite. The solid content in the undoped dispersion is filtered and washed to isolate the desired polyaniline/carbon composite.

(2) The solvent is removed from the dispersion obtained by mixing a conductive polyaniline dispersion and a carbonaceous material to obtain a conductive polyaniline/carbon composite. The composite thus obtained is treated with a basic substance to prepare the desired polyaniline/carbon composite.

(3) A dispersion obtained by mixing a conductive polyaniline dispersion and an aprotonic solvent is treated with a basic substance to obtain an undoped polyaniline dispersion. A carbonaceous material is mixed in the polyaniline dispersion, then the solid content is filtered and washed to prepare the desired polyaniline/carbon composite.

(4) A dispersion obtained by mixing a conductive polyaniline dispersion, carbonaceous material and an aprotonic solvent is treated with a basic substance to prepare a polyaniline/carbon composite. The solid content in the dispersion is filtered and washed to isolate the desired polyaniline/carbon composite.

(5) A precipitate formed by treating a conductive polyaniline dispersion with a basic substance is filtered and washed to obtain an undoped state polyaniline powder. This polyaniline powder and a carbonaceous material are mixed and dispersed to prepare the desired polyaniline/carbon composite. Further, a dispersion of the polyaniline powder dispersed and dissolved in an aprotonic solvent and a carbonaceous material were mixed, then the solvent is removed to prepare the desired polyaniline/carbon composite.

Further, as the method of mixing the conductive polyaniline dispersion, polyaniline dispersion and/or polyaniline powder, and a carbonaceous material, the method of mixing the polyaniline dispersion and/or powder with the total amount of the carbonaceous material or the method of mixing the polyaniline dispersion and/or powder with a part of the carbonaceous material, preparing a polyaniline/carbon composite in advance, and then mixing the resultant composite with the remainder of the carbonaceous material may be illustrated.

The method of treatment by a basic substance is not particularly limited so long as it is a method capable of undoping the doped conductive polyaniline and neutralize the sulfonic acid used as the dopant, but the method of causing a basic substance to act on the mixed dispersion or composite may be mentioned. As the basic substance, preferably ammonia water, sodium hydroxide, potassium hydroxide, lithium hydroxide, magnesium hydroxide, calcium hydroxide and other metal hydroxides; methylamine, ethylamine, triethylamine and other amines; tetramethyl ammonium hydroxide, tetraethyl ammonium hydroxide, and other alkyl ammonium hydroxides; hydrazine, phenyl hydrazine and other hydrazine compounds; diethyl hydroxylamine, dibenzyl hydroxylamine and other hydroxylamine compounds are used. As the treatment by a basic substance, the method for mixing the above mixed dispersion or composite with an above basic substance, the method of mixing the above mixed dispersion or composite with water and/or an organic solvent in which an above basic substance is dissolved, the method of bringing the above mixed dispersion or composite into contact with a gas of an above basic substance, etc. may be mentioned. The organic solvent for dissolving the basic substance is not particularly limited so long as it dissolves the basic substance, but toluene, xylene and other aromatic hydrocarbons, hexane, heptane, cyclohexane and other aliphatic hydrocarbons, chloroform, dichloromethane and other halogenated hydrocarbons, ethyl acetate, butyl acetate and other esters, methanol, ethanol and other alcohols, dimethyl sulfoxide and other sulfoxides, dimethyl formamide and other amides, N-methyl-2-pyrrolidone, etc. may be mentioned.

As the aprotonic solvent usable in the operations of the above-mentioned (3), (4) and (5), for example, dimethyl sulfoxide, diethyl sulfoxide, and other sulfoxides; propylene carbonate, dimethyl carbonate, diethyl carbonate and other carbonic acid esters; γ-butyrolactone, γ-valerolactone, and other lactones; acetonitrile, propionitrile and other nitriles; N-methyl-2-pyrrolidone; etc. may be mentioned.

The polyaniline or its derivative of the polyaniline/carbon composite of the present invention is formed by removing the dopant of said conductive polyaniline by the above treatment by a basic substance, but a conductive polyaniline from which the dopant has not been completely removed may also be used. The amount of the dopant contained in the polyaniline formed by the treatment by a basic substance is a molar ratio of 0 to 0.3 per monomer unit of the polyaniline, preferably 0 to 0.1.

The mixing method used when preparing the polyaniline/carbon composite of the present invention may be preparation by use of a conventional mixer, but a sandmill, beads mill, ball mill, planetary ball mill, triple roll mill, colloid mill, ultrasonic homogenizer, Henschel mixer, jet mill, or other disperser may also be used.

According to the present invention, it is possible to use an electrode material having said polyaniline/carbon composite as an active substance and utilize this and a current collector (for example, platinum, copper, nickel, aluminum, conductive carbonaceous material, and conductive rubber material) to form a polarizable electrode. Further, in the present invention, since the polymer compound polyaniline is used, a binder is not necessarily required, but may be used. The binder which may be used is not particularly limited. For example, polyvinylidene fluoride, polytetrafluoroethylene, fluoroolefin copolymer, carboxymethyl cellulose, polyvinyl alcohol, polyacrylic acid, polyvinyl pyrrolidone, polymethyl methacrylate, etc. may be mentioned. In this way, it is possible to obtain a high electrostatic capacity electric double-layer capacitor. The polarizable electrode and electric double-layer capacitor can be prepared by a general method other than the use of the polyaniline/carbonaceous material composite.

EXAMPLES

Examples will be used to further explain the present invention, but the scope of the present invention is not limited to these Examples of course.

Preparation of Polyaniline Toluene Dispersion

In 150 g of toluene, 12.6 g of aniline, 26.4 g of dodecyl benzosulfonic acid and 0.63 g of 2,4,6-trimethylaniline were dissolved, then 100 g of distilled water in which 22.5 ml of 6 N hydrochloric acid was dissolved, was added. To the mixed solution, 3.8 g of tetrabutyl ammonium bromide was added, the mixture was cooled to 5° C. or less, then 80 g of distilled water, in which 33.9 g of ammonium persulfate was dissolved, was added. The mixture was oxidatively polymerized in a state of 5° C. or less for 6 hours, then 100 g of toluene, then a methanol-water mixed solvent (water/methanol=2/3 (weight ratio)) were added thereto, and the resultant mixture was stirred. After the end of stirring, the reaction solution was separated into the toluene layer and the aqueous layer, and only the aqueous layer was removed so as to obtain a polyaniline toluene dispersion. A part of the polyaniline toluene dispersion was taken and the toluene distilled off in vacuo, whereupon the dispersion contained solids in an amount of 12.9 wt % (i.e., polyaniline content: 5 wt %). Further, this dispersion was filtered by a filter having a pore size of 1.0 μm, whereupon there was no clogging. The particle size of the polyaniline particles in the dispersion was analyzed by an ultrasonic particle size distribution measurement apparatus (made by Matec Applied Sciences, APS-100). As a result, it was learned that the particle size distribution was a mono-dispersion (i.e., the peak value 0.33 μm, the half width of 0.17 μm). Further, this dispersion did not agglomerate or precipitate even after the elapse of 1 year at room temperature, and thus was stable. From the elementary analysis, the molar ratio of the dodecyl benzene sulfonic acid per aniline monomer unit was 0.45. The yield of the polyaniline obtained was 96%.

Preparation of Undoped Polyaniline Powder

To 100 g of the polyaniline toluene dispersion obtained above, 500 ml of a 2 mole/liter triethylamine in methanol solution was added, then the resultant mixture was stirred and mixed for 5 hours. After the end of the stirring, the precipitate was obtained by filtration and washed with methanol. The filtrate and the washed solution at this time were colorless and transparent. The washed and purified precipitate was dried in vacuo to prepare the updoped polyaniline powder. 5 g of the polyaniline powder was added to 95 g of N-methyl-2-pyrrolidone (NMP) and mixed to prepare a polyaniline N-methyl-2-pyrrolidone dispersion. The particle size of the polyaniline particles in the dispersion was analyzed by an ultrasonic particle size distribution measurement apparatus (made by Matec Applied Sciences, APS-100). As a result, it was learned that the particle size distribution was a mono-dispersion (i.e., the peak value 0.31 μm, the half width 0.17 μm).

Polyaniline N-Methyl-2-Pyrrolidone Dispersion (Polyaniline NMP Dispersion)

5 g of undoped polyaniline powder (made by Aldrich Japan K.K., average molecular weight of 10,000) was added to 95 g of N-methyl-2-pyrrolidone (NMP) and mixed to prepare a polyaniline N-methyl-2-pyrrolidone dispersion. The particle size of the polyaniline particles in the dispersion was analyzed by an ultrasonic particle size distribution measurement apparatus (made by Matec Applied Sciences, APS-100). As a result, it was learned that the particle size distribution was comprised of an (A) peak (i.e., the peak value 0.31 μm, the half width 0.17 μm), a (B) peak (i.e., the peak value 1.1 μm, the half width 0.43 μm), and a (C) peak (i.e., the peak value 6.8 μm, the half width 0.8 μm) and that the peak area ratio (A):(B):(C) was 55:40:5. From the results of the particle size distribution, it was learned that the polyaniline N-methyl-2-pyrrolidone dispersion contains a mixture of agglomerates.

Preparation of Polyaniline/Carbon Composite 1

To 20 g of polyaniline toluene dispersion, 1 g of conductive carbon black (made by Lion Corporation, Ketjen Black ECP600JD) was added and mixed to obtain a mixed dispersion of conductive polyaniline and carbon black. To the mixed dispersion, 200 ml of a 2 mole/liter triethylamine in methanol solution was added, then the mixture was stirred and mixed for 5 hours. After ending the stirring, the precipitate was recovered by filtration and was washed with methanol. The filtrate and the washed solution at this time were colorless and transparent. The washed and purified precipitate was dried in vacuo to prepare the polyaniline/carbon composite 1.

Preparation of Polyaniline/Carbon Composite 2

Except for changing the 20 g of polyaniline toluene dispersion to 30 g of polyaniline toluene dispersion, the same method as for preparing the polyaniline/carbon composite 1 was used to prepare the polyaniline/carbon composite 2.

Preparation of Polyaniline/Carbon Composite 3

Except for changing the 20 g of polyaniline toluene dispersion to 40 g of polyaniline toluene dispersion, the same method as for preparing the polyaniline/carbon composite 1 was used to prepare the polyaniline/carbon composite 3.

Preparation of Polyaniline/Carbon Composite 4

To 20 g of polyaniline toluene dispersion, 7.5 g of activated carbon (i.e., the specific surface area 2000 $m^2/g$, the average particle size 10 μm) and 1 g of conductive carbon black (made by Lion Corporation, Ketjen Black ECP600JD) were added and mixed to obtain a mixed dispersion of conductive polyaniline, activated carbon and carbon black. To the mixed dispersion, 200 ml of a 2 mole/liter triethylamine in methanol solution was added, then the mixture was stirred and mixed for 5 hours. After ending the stirring, the precipitate was recovered by filtration and was washed with methanol. The filtrate and the washed solution at this time were colorless and transparent. The washed and purified precipitate was dried in vacuo to prepare the polyaniline/carbon composite 4.

Preparation of Polyaniline/Carbon Composite 5

Except for the amounts of the polyaniline toluene dispersion, the activated carbon (i.e., the specific surface area 2000 $m^2/g$, the average particle size 10 μm) and the conductive carbon black (made by Lion Corporation, Ketjen Black ECP600JD) being respectively 30 g, 7.0 g, and 1 g, the same method as for preparing the polyaniline/carbon composite 4 was used to prepare the polyaniline/carbon composite 5.

Preparation of Polyaniline/Carbon Composite 6

1 g of the above-mentioned undoped polyaniline powder, 1 g of conductive carbon black (made by Lion Corporation, Ketjen Black ECP600JD) and 20 g of N-methyl-2-pyrrolidone (NMP) were mixed by a mortar to prepare the paste-like polyaniline/carbon composite 6.

Preparation of Polyaniline/Carbon Composite 7

1.5 g of the above-mentioned undoped polyaniline powder, 1 g of conductive carbon black (made by Lion Corporation, Ketjen Black ECP600JD) and 20 g of N-methyl-2-pyrrolidone (NMP) were mixed by a mortar to prepare the paste-like polyaniline/carbon composite 7.

Preparation of Polyaniline/Carbon Composite 8

To 20 g of the above-mentioned polyaniline NMP dispersion, 1 g of conductive carbon black (made by Lion Corporation, Ketjen Black ECP600JD) was mixed by a mortar to prepare the paste-like polyaniline/carbon composite 8.

Preparation of Polyaniline/Carbon Composite 9

To 30 g of the above-mentioned polyaniline NMP dispersion, 1 g of conductive carbon black (made by Lion Corporation, Ketjen Black ECP600JD) was mixed by a mortar to prepare the paste-like polyaniline/carbon composite 9.

Preparation of Polyaniline/Carbon Composite 10

To 20 g of the above-mentioned polyaniline NMP dispersion, 7.5 g of activated carbon (i.e., the specific surface area 2000 $m^2/g$, the average particle size 10 μm) and 1 g of conductive carbon black (made by Lion Corporation, Ketjen Black ECP600JD) were mixed by a mortar to prepare the paste-like polyaniline/carbon composite 10 comprised of the conductive polyaniline, the activated carbon and the carbon black.

Preparation of Polyaniline/Carbon Composite 11

1 g of a polyaniline powder (made by Aldrich Japan K.K., average molecular weight 10,000), 1 g of conductive carbon black (made by Lion Corporation, Ketjen Black ECP600JD) and 20 g of N-methyl-2-pyrrolidone (NMP) were mixed by a mortar to prepare the paste-like polyaniline/carbon composite 11.

Preparation of Polyaniline/Carbon Composite 12

20 g of an aqueous polyaniline sulfonic acid solution (made by Aldrich Japan K.K., 5% aqueous solution) and 1 g of conductive carbon black (made by Lion Corporation, Ketjen Black ECP600JD) were mixed by a mortar to prepare the paste-like polyaniline/carbon composite 12.

Fabrication of Electrode 1

The polyaniline/carbon composite 1 (2 g), activated carbon (i.e., the specific surface area 2000 $m^2/g$, the average particle size 10 μm) (7.5 g), and carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding water (30 g), the mixture was further mixed by a mortar to obtain a paste. This paste was coated on aluminum foil (i.e., the thickness 30 μm) to give a thickness of the active substance layer of 100 μm. This was dried at 150° C. for 24 hours, then was dried in vacuo at 150° C. for 2 hours. The resultant sheet-shaped electrode was pressed at 20 MPa, then was cut out to 1 cm×1 cm dimensions to prepare the evaluation use electrode 1.

Fabrication of Electrode 2

The polyaniline/carbon composite 2 (2.5 g), activated carbon (i.e., the specific surface area 2000 $m^2/g$, the average particle size 10 μm) (7.0 g), and carboxymethylcellulose sodium salt (made by Aldrich Japan K.K., the viscosity 1500-300 cP (i.e., 1% aqueous solution)) (0.5 g) were sufficiently mixed and dispersed by a mortar, then, while gradually adding water (30 g), the mixture was further mixed by a mortar to obtain a paste. Except for using this paste, the same method as in Example 1 was used to prepare the evaluation use electrode 2.

Fabrication of Electrode 3

The polyaniline/carbon composite 3 (3.0 g), activated carbon (i.e., the specific surface area 2000 $m^2/g$, the average particle size 10 μm) (6.5 g), and carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding water (30 g), the mixture was further mixed by a mortar to obtain a paste. Except for using this paste, the same method as in Example 1 was used to prepare the evaluation use electrode 3.

Fabrication of Electrode 4

The polyaniline/carbon composite 4 (9.5 g) and carboxymethylcellulose sodium salt (made by Aldrich Japan K.K., viscosity 1500-3000 cP (i.e., 1% aqueous solution)) (0.5 g) were sufficiently mixed and dispersed by a mortar, then, while gradually adding (30 g), the mixture was further mixed by a mortar to obtain a paste. Except for using this paste, the same method as in Example 1 was used to prepare the evaluation use electrode 4.

Fabrication of Electrode 5

The polyaniline/carbon composite 5 (9.5 g) and carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding (30 g), the mixture was further mixed by a mortar to obtain a paste. Except for using this paste, the same method as in Example 1 was used to prepare the evaluation use electrode 5.

Fabrication of Electrode 6

The polyaniline/carbon composite 6 (22 g), activated carbon (i.e., specific surface area 2000 $m^2/g$, the average particle size 10 μm) (7.5 g), carboxymethylcellulose sodium salt (made by Aldrich Japan K.K., viscosity 1500-3000 cP (i.e., 1% aqueous solution)) (0.5 g) were sufficiently mixed and dispersed by a mortar, then, while gradually adding water (20 g), the mixture was further mixed by a mortar to obtain a paste. Except for using this paste, the same method as in Example 1 was used to prepare the evaluation use electrode 6.

Fabrication of Electrode 7

The polyaniline/carbon composite 7 (22.5 g), activated carbon (i.e., the specific surface area 2000 $m^2/g$, the average particle size 10 μm) (7.0 g), and carboxymethylcellulose sodium salt (made by Aldrich Japan K.K., viscosity 1500-3000 cP (i.e., 1% aqueous solution)) (0.5 g) were sufficiently mixed and dispersed by a mortar, then, while gradually adding water (20 g), the mixture was further mixed by a mortar to obtain a paste. Except for using this paste, the same method as in Example 1 was used to prepare the evaluation use electrode 7.

Fabrication of Electrode 8

Activated carbon (i.e., the specific surface area 2000 $m^2/g$, the average particle size 10 μm) (8.5 g), conductive carbon black (made by Lion Corporation, Ketjen Black ECP600JD) (1.0 g) and carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding (30 g), the mixture was further mixed by a mortar to obtain a paste. Except for using this paste, the same method as in Example 1 was used to prepare the evaluation use electrode 8.

Fabrication of Electrode 9

The polyaniline/carbon composite 8 (22 g), activated carbon (i.e., the specific surface area 2000 $m^2/g$, the average particle size 10 μm) (7.5 g), and carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding water (20 g), the mixture was further mixed by a mortar to obtain a paste. Except for using this paste, the same method as in Example 1 was used to prepare the evaluation use electrode 9.

Fabrication of Electrode 10

The polyaniline/carbon composite 9 (31 g), activated carbon (i.e., the specific surface area 2000 $m^2/g$, the average particle size 10 μm) (7.0 g), carboxymethylcellulose sodium salt (made by Aldrich Japan K.K., the viscosity 1500-3000 cP (i.e., 1% aqueous solution)) (0.5 g) were sufficiently mixed and dispersed by a mortar, then, while gradually adding water (20 g), the mixture was further mixed by a mortar to obtain a paste. Except for using this paste, the same method as in Example 1 was used to prepare the evaluation use electrode 10.

Fabrication of Electrode 11

The polyaniline/carbon composite 10 (28.5 g) and carboxymethylcellulose sodium salt (made by Aldrich Japan K.K., the viscosity 1500-3000 cP (i.e., 1% aqueous solution)) (0.5 g) were mixed and dispersed by a mortar, then, while gradually adding water (20 g), the mixture was further mixed by a mortar to obtain a paste. Except for using this paste, the same method as in Example 1 was used to prepare the evaluation use electrode 11.

Fabrication of Electrode 12

The polyaniline/carbon composite 11 (22 g), activated carbon (i.e., the specific surface area 2000 $m^2/g$, the average particle size 10 μm) (7.5 g), and carboxymethylcellulose sodium salt (made by Aldrich Japan K.K., the viscosity 1500-3000 cP (i.e., 1% aqueous solution)) (0.5 g) were mixed and dispersed by a mortar, then, while gradually adding water (20 g), the mixture was further mixed by a mortar to obtain a paste. Except for using this paste, the same method as in Example 1 was used to prepare the evaluation use electrode 12.

Fabrication of Electrode 13

The polyaniline/carbon composite 12 (21 g), activated carbon (i.e., the specific surface area 2000 $m^2/g$, the average particle size 10 μm) (7.5 g), and carboxymethylcellulose sodium salt (made by Aldrich Japan K.K., the viscosity 1500-3000 cP (i.e., 1% aqueous solution)) (0.5 g) were mixed and dispersed by a mortar, then, while gradually adding water (20 g), the mixture was further mixed by a mortar to obtain a paste. Except for using this paste, the same method as in Example 1 was used to prepare the evaluation use electrode 13.

Measurement of Specific Capacity

In each of Examples 1 to 7 and Comparative Examples 1 to 6, the following method was used to prepare an electric double-layer capacitor and find the specific capacity for each electrode active substance.

The above evaluation use electrodes 1 to 12 were made to face each other, as positive and negative electrodes, across glass fiber filter paper (Wattman Filter Paper GF/A) and 1 M propylene carbonate solution of tetraethyl ammonium fluoroborate was used as an electrolyte solution to prepare electric double-layer capacitors. These electric double-layer capacitors were subjected to charging/discharging tests using a charging/discharging tester (made by Hokuto Denko, HJ1001SM8A). The charging was performed by a constant current of 2 mA. After the voltage reached 2.5 V, the charging was performed by constant current charging for 1 hour. The discharging was performed by a constant current of 2 mA and with an end voltage of 0 V. The charging/discharging test was repeated 1000 times for each capacitor. The specific capacity per weight of the electrode active substance was found from the discharge curve of the 10th cycle. Further, the specific capacity per weight of the electrode active substance was found from the discharge curve of the 1000th cycle and the ratio with the specific capacity found from the discharge curve of the 10th cycle was used as the cycle characteristics (=specific capacity found from 1000th cycle discharge curve/ specific capacity found from discharge curve of 10th). This was made an indicator of the stability of the electrodes.

Table I shows the ratios of compositions of materials included in the electrodes 1 to 13 and the specific capacities and cycle characteristics of the electrodes found from the electric double-layer capacitors using the electrodes 1 to 13.

TABLE I

| | Ex. 1 | Ex. 2 | Ex. 3 | Ex. 4 | Ex. 5 | Ex. 6 | Ex. 7 |
|---|---|---|---|---|---|---|---|
| Polyaniline/carbon composite | Composite 1 | Composite 2 | Composite 3 | Composite 4 | Composite 5 | Composite 6 | Composite 7 |
| Electrode | Electrode 1 | Electrode 2 | Electrode 3 | Electrode 4 | Electrode 5 | Electrode 6 | Electrode 7 |

TABLE I-continued

| Ratio of composition | | | | | | | |
|---|---|---|---|---|---|---|---|
| Activated carbon | 7.5 | 7.0 | 6.5 | 7.5 | 7.0 | 7.5 | 7.0 |
| Polyaniline 1* | 1.0 | 1.5 | 2.0 | 1.0 | 1.5 | 1.0 | 1.5 |
| Polyaniline 2** | — | — | — | — | — | — | — |
| Polyaniline sulfonic acid | — | — | — | — | — | — | — |
| Conductive aid*** | 1.0 | 1.0 | 1.0 | 1.0 | 1.0 | 1.0 | 1.0 |
| Binder**** | 0.5 | 0.5 | 0.5 | 0.5 | 0.5 | 0.5 | 0.5 |
| Specific capacity [F/g] | 28 | 31 | 33 | 26 | 27 | 27 | 30 |
| Cycle characteristic | 0.93 | 0.91 | 0.92 | 0.90 | 0.91 | 0.92 | 0.91 |

|  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Polyaniline/carbon composite | — | Composite 8 | Composite 9 | Composite 10 | Composite 11 | Composite 12 |
| Electrode | Electrode 8 | Electrode 9 | Electrode 10 | Electrode 11 | Electrode 12 | Electrode 13 |
| Ratio of composition | | | | | | |
| Activated carbon | 8.5 | 7.5 | 7.0 | 7.5 | 7.5 | 7.5 |
| Polyaniline 1* | — | — | — | — | — | — |
| Polyaniline 2** | — | 1.0 | 1.5 | 1.0 | 1.0 | — |
| Polyaniline sulfonic acid | — | — | — | — | — | 1.0 |
| Conductive aid*** | 1.0 | 1.0 | 1.0 | 1.0 | 1.0 | 1.0 |
| Binder**** | 0.5 | 0.5 | 0.5 | 0.5 | 0.5 | 0.5 |
| Specific capacity [F/g] | 18 | 22 | 24 | 20 | 19 | 21 |
| Cycle characteristic | 0.92 | 0.90 | 0.88 | 0.89 | 0.88 | 0.80 |

*Polyaniline 1 (invention product)
**Polyaniline 2 (made by Aldrich Japan K.K., undoped polyaniline)
***Conductive carbon black (made by Lion Corporation, Ketjen Black ECP600JD)
****Carboxymethylcellulose sodium salt (made by Aldrich Japan K.K., the viscosity 1500-3000 cP (i.e., 1% aqueous solution))

In each of Examples 8 to 10 and Comparative Examples 7 to 10, the following method was used to prepare an electric double-layer capacitor and find the specific capacity for each electrode active substance.

The above evaluation use electrodes 1 to 3, 8 to 10, and 13 were made to face each other, as positive and negative electrodes, across glass fiber filter paper (Wattman Filter Paper GF/A) and a 15 wt % sulfuric acid aqueous solution was used as an electrolyte solution to prepare electric double-layer capacitors. These electric double-layer capacitors were subjected to charging/discharging tests using a charging/discharging tester (made by Hokuto Denko, HJ1001SM8A). The charging was performed by a constant current of 2 mA. After the voltage reached 1.0 V, the charging was performed by constant current charging for 1 hour. The discharging was performed by a constant current of 2 mA and with an end voltage of 0 V. The charging/discharging test was repeated 1000 times for each capacitor. The specific capacity per weight of the electrode active substance was found from the discharge curve of the 10th cycle. Further, the specific capacity per weight of the electrode active substance was found from the discharge curve of the 1000th cycle and the ratio with the specific capacity found from the discharge curve of the 10th cycle was used as the cycle characteristics (=specific capacity found from 1000th cycle discharge curve/specific capacity found from discharge curve of 10th). This was made an indicator of the stability of the electrodes.

Table II shows the ratios of composition of the materials included in the electrodes 1 to 3, 8 to 10, and 13 and the specific capacities and cycle characteristics of the electrodes found from the electric double-layer capacitors using the electrodes 1 to 3, 8 to 10, and 13.

TABLE II

|  | Ex. 8 | Ex. 9 | Ex. 10 | Comp. Ex. 7 | Comp. Ex. 8 | Comp. Ex. 9 | Comp. Ex. 10 |
|---|---|---|---|---|---|---|---|
| Polyaniline/carbon composite | Composite 1 | Composite 2 | Composite 3 | — | Composite 8 | Composite 9 | Composite 12 |
| Electrode | Electrode 1 | Electrode 2 | Electrode 3 | Electrode 8 | Electrode 9 | Electrode 10 | Electrode 13 |
| Ratio of composition | | | | | | | |
| Activated carbon | 7.5 | 7.0 | 6.5 | 8.5 | 7.5 | 7.0 | 7.0 |
| Polyaniline 1* | 1.0 | 1.5 | 2.0 | — | — | — | — |
| Polyaniline 2** | — | — | — | — | 1.0 | 1.5 | — |
| Polyaniline sulfonic acid | — | — | — | — | — | — | 1.0 |
| Conductive aid*** | 1.0 | 1.0 | 1.0 | 1.0 | 1.0 | 1.0 | 1.0 |
| Binder**** | 0.5 | 0.5 | 0.5 | 0.5 | 0.5 | 0.5 | 0.5 |
| Specific capacity [F/g] | 105 | 125 | 132 | 68 | 90 | 98 | 95 |
| Cycle characteristic | 0.93 | 0.91 | 0.92 | 0.92 | 0.92 | 0.90 | 0.78 |

*Polyaniline 1 (invention product)
**Polyaniline 2 (made by Aldrich Japan K.K., undoped polyaniline)
***Conductive carbon black (made by Lion Corporation, Ketjen Black ECP600JD)
****Carboxymethylcellulose sodium salt (made by Aldrich Japan K.K., the viscosity 1500-3000 cP (i.e., 1% aqueous solution))

As explained above, it is learned that an electric double-layer capacitor using a polyaniline/carbon composite comprised of polyaniline formed by undoping a conductive polyaniline dispersion and a carbon-based material (see Examples 1 to 10) is superior in the specific capacity and the cycle characteristics compared with only an activated carbon electrode (see Comparative Examples 1 and 7), polyaniline/carbon composites 8 to 11 comprised of undoped polyaniline powder (commercially available product: emeraldine base type polyaniline) and a carbonaceous material (see Comparative Examples 2 to 5 and Comparative Examples 8 to 9), and a polyaniline/carbon composite 12 comprised of an aqueous polyaniline sulfonic acid solution and a carbonaceous material (Comparative Examples 6 and 10).

INDUSTRIAL APPLICABILITY

As explained above, the polyaniline/carbon composite according to the present invention can give an electric double-layer capacitor superior in high electrostatic capacity and cycle characteristics by undoping. For example, this is suitable for use for a memory backup power source of a mobile phone etc., an emergency power source for a computer etc., an energy storage device in a solar power generation system etc., a storage device for recovered braking energy in an electric-gasoline hybrid car etc.

The invention claimed is:

1. A polyaniline/carbon composite comprising polyaniline or its derivative combined with a carbonaceous material, in which polyaniline/carbon composite, the polyaniline or its derivative is a conductive polyaniline or its derivative dispersed in a nonpolar organic solvent and undoped by the treatment with a basic substance, wherein said conductive polyaniline or its derivative is obtained by oxidatively polymerizing a sulfonic acid and aniline or its derivative in a mixed solvent comprised of water and a nonpolar organic solvent in the presence of a molecular weight adjuster and an interphase transfer catalyst.

2. A polyaniline/carbon composite as claimed in claim 1, wherein the amount of the polyaniline or its derivative is 1 to 300 parts by weight, based upon 100 parts by weight of the carbonaceous material.

3. An electrode material for an electric double-layer capacitor using a polyaniline/carbon composite according to claim 1 as an active substance, a current collector and a binder.

4. An electric double-layer capacitor comprising a polarizable electrode using the electrode material according to claim 3.

* * * * *